(12) United States Patent
Sugano

(10) Patent No.: US 12,304,458 B2
(45) Date of Patent: May 20, 2025

(54) AUTOMATED VALET PARKING SYSTEM, CONTROL METHOD OF AUTOMATED VALET PARKING SYSTEM, AND AUTONOMOUS DRIVING VEHICLE

(71) Applicant: TOYOTA JIDOSHA KABUSHIKI KAISHA, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 404 days.

(21) Appl. No.: 17/567,477

(22) Filed: Jan. 3, 2022

(65) Prior Publication Data
US 2022/0212657 A1 Jul. 7, 2022

(30) Foreign Application Priority Data
Jan. 7, 2021 (JP) ................................ 2021-001382

(51) Int. Cl.
*B60W 30/06* (2006.01)
*B60W 30/165* (2020.01)
*B60W 60/00* (2020.01)

(52) U.S. Cl.
CPC .......... *B60W 30/06* (2013.01); *B60W 30/165* (2013.01); *B60W 60/001* (2020.02); *B60W 2530/201* (2020.02); *B60W 2552/05* (2020.02)

(58) Field of Classification Search
CPC .. B60W 30/06; B60W 30/165; B60W 60/001; B60W 2530/201; B60W 2552/05; B60W 60/00; B60W 30/10; B60W 30/18036; B60W 50/14; B62D 15/0285; G08G 1/143; G08G 1/168; G08G 1/146; G06Q 50/30
See application file for complete search history.

(56) References Cited

U.S. PATENT DOCUMENTS

| 2012/0245981 | A1* | 9/2012 | Volz ....................... G07B 15/02 705/13 |
| 2015/0134185 | A1 | 5/2015 | Lee |
| 2015/0254981 | A1* | 9/2015 | Tachibana ............ G06V 20/586 340/932.2 |

(Continued)

FOREIGN PATENT DOCUMENTS

| CN | 111508271 A | 8/2020 |
| CN | 112119437 A | 12/2020 |

(Continued)

*Primary Examiner* — Jason Holloway
*Assistant Examiner* — Elizabeth Rose Neleski
(74) *Attorney, Agent, or Firm* — Dinsmore & Shohl LLP

(57) ABSTRACT

The system includes a first movement permission area setting unit configured to set a movement permission area for autonomous traveling that includes a part of a traveling path along which the autonomous driving vehicle reaches the target parking space and does not include the target parking space, and a second movement permission area setting unit configured to, when it is determined that the autonomous driving vehicle has arrived near the target parking space or when notification of a start of the automated valet parking for the target parking space is sent from the autonomous driving vehicle, set a movement permission area for automated valet parking that includes the target parking space and a part of the traveling path near the target parking space.

16 Claims, 10 Drawing Sheets

(56) References Cited

U.S. PATENT DOCUMENTS

| | | | |
|---|---|---|---|
| 2015/0353080 A1 | 12/2015 | Mukaiyama | |
| 2017/0137024 A1* | 5/2017 | Elie | G05D 1/0246 |
| 2018/0292832 A1* | 10/2018 | Bae | B60W 30/06 |
| 2020/0114904 A1 | 4/2020 | Lee | |
| 2020/0148196 A1 | 5/2020 | Lim | |
| 2020/0207336 A1 | 7/2020 | Oh | |
| 2020/0209877 A1 | 7/2020 | Yoon | |
| 2020/0211071 A1* | 7/2020 | Rosas-Maxemin | G06Q 30/0284 |
| 2020/0211400 A1* | 7/2020 | Cho | G01C 21/3407 |
| 2020/0387153 A1 | 12/2020 | Noguchi et al. | |
| 2021/0089020 A1* | 3/2021 | Shimamoto | G01C 21/3605 |
| 2021/0213937 A1 | 7/2021 | Imai et al. | |
| 2021/0217310 A1* | 7/2021 | Ikoma | G08G 1/146 |
| 2022/0197305 A1* | 6/2022 | Kim | G06Q 10/06315 |

FOREIGN PATENT DOCUMENTS

| | | | |
|---|---|---|---|
| JP | 2015075899 A * | 4/2015 | |
| JP | 2018-034540 A | 3/2018 | |
| JP | 2018-034541 A | 3/2018 | |
| JP | 2019-137124 A | 8/2019 | |
| JP | 2019-159462 A | 9/2019 | |
| JP | 2020-011559 A | 1/2020 | |
| JP | 2020-109668 A | 7/2020 | |
| JP | 2020187487 A | 11/2020 | |
| KR | 10-1906952 B1 | 10/2018 | |
| KR | 10-2020-0046160 A | 5/2020 | |
| KR | 10-2020-0057819 A | 5/2020 | |
| KR | 10-2020-0087319 A | 7/2020 | |

\* cited by examiner

AUTOMATED VALET PARKING SYSTEM, CONTROL METHOD OF AUTOMATED VALET PARKING SYSTEM, AND AUTONOMOUS DRIVING VEHICLE

TECHNICAL FIELD

The present disclosure relates to an automated valet parking system, a control method of an automated valet parking system, and an autonomous driving vehicle.

CROSS-REFERENCE TO RELATED APPLICATION

This application claims the benefit of priority from Japanese Patent Application No. 2021-001382, filed Jan. 7, 2021, the entire contents of which are incorporated herein by reference.

BACKGROUND

In the related art, Japanese Unexamined Patent Publication No. 2019-159462 is known as a technical document relating to traveling assistance of an autonomous driving vehicle. This publication discloses a traveling assistance device that assists the traveling of the vehicle by using lane boundary data on a map. The lane boundary data includes coordinate data of a lane boundary line such as a white line.

SUMMARY

However, in an automated valet parking system that performs automated valet parking of an autonomous driving vehicle in a parking place, it may be necessary to be parked across a white line such as a parking frame. When a boundary or an area where the vehicle can travel is strictly set based on the white line or the like, since automated valet parking may not be implemented, a problem is caused.

According to one aspect of the present disclosure, there is provided an automated valet parking system that causes an autonomous driving vehicle in a parking place to autonomously travel toward a target parking space and causes the autonomous driving vehicle to be automatically parked in the target parking space. The system includes a first movement permission area setting unit configured to set a movement permission area for autonomous traveling that includes a part of a traveling path along which the autonomous driving vehicle reaches the target parking space and does not include the target parking space based on positional information of the autonomous driving vehicle, positional information of the target parking space, and parking place map information, a first movement permission area instruction unit configured to, when the movement permission area for autonomous traveling is set, instruct the autonomous driving vehicle about the movement permission area for autonomous traveling, a second movement permission area setting unit configured to, when it is determined that the autonomous driving vehicle has arrived near the target parking space or when notification of a start of the automated valet parking for the target parking space is sent from the autonomous driving vehicle, set a movement permission area for automated valet parking that includes the target parking space and a part of the traveling path near the target parking space based on the positional information of the autonomous driving vehicle, the positional information of the target parking space, and the parking place map information, and a second movement permission area instruction unit configured to, when the movement permission area for automated valet parking is set, instruct the autonomous driving vehicle about the movement permission area for automated valet parking.

In accordance with the automated valet parking system according to one aspect of the present disclosure, after the instruction about the movement permission area for autonomous traveling is given to the autonomous driving vehicle, when it is determined that the autonomous driving vehicle has arrived near the target parking space or when the notification of the start of the automated valet parking for the target parking space is sent from the autonomous driving vehicle, since the instruction about the movement permission area for automated valet parking is given to the autonomous driving vehicle, the instructions about the movement permission area for autonomous traveling and the movement permission area for automated valet parking corresponding to the status of the autonomous driving vehicle can be appropriately given.

In the above-mentioned automated valet parking system, the second movement permission area setting unit may be configured to set the movement permission area for automated valet parking including a head swing region in which the autonomous driving vehicle is parked in the target parking space by moving backward.

In the above-mentioned automated valet parking system, the second movement permission area setting unit may be configured to, when the autonomous driving vehicle that performs the automated valet parking does not fit in the target parking space by moving forward once, set the movement permission area for automated valet parking including a turn-back region in which the autonomous driving vehicle fits in the target parking space by turn-back movement.

In the above-mentioned automated valet parking system, the second movement permission area setting unit may be configured to set the movement permission area for automated valet parking including a following vehicle entrance prohibition region in which entrance of a following autonomous driving vehicle that is performing the autonomous traveling and follows the autonomous driving vehicle which is an instruction target of the movement permission area for automated valet parking is prohibited, and perform control such that the following autonomous driving vehicle does not enter the movement permission area for automated valet parking.

In the above-mentioned automated valet parking system, the second movement permission area setting unit may be configured to, when a general vehicle parked to protrude from a parking frame of the parking place is recognized from a detection result of a parking place sensor provided in the parking place, set the movement permission area for automated valet parking not to include the general vehicle.

According to another aspect of the present disclosure, there is provided a control method of an automated valet parking system that causes an autonomous driving vehicle in a parking place to autonomously travel toward a target parking space and causes the autonomous driving vehicle to be automatically parked in the target parking space. The method includes setting a movement permission area for autonomous traveling that includes a part of a traveling path along which the autonomous driving vehicle reaches the target parking space and does not include the target parking space based on positional information of the autonomous driving vehicle, positional information of the target parking space, and parking place map information, instructing the autonomous driving vehicle about the movement permission area for autonomous traveling when the movement permission area for autonomous traveling is set, setting a movement permission area for automated valet parking that includes the target parking space and a part of the traveling path near the target parking space based on the positional information of the autonomous driving vehicle, the positional information of the target parking space, and the parking place map information when it is determined that the autonomous driving vehicle has arrived near the target parking space or when notification of a start of the automated valet parking for the target parking space is sent from the autonomous driving vehicle, and instructing the autonomous driving vehicle about the movement permission area for automated valet parking to when the movement permission area for automated valet parking is set.

In accordance with the control method of the automated valet parking system according to another aspect of the present disclosure, after the instruction about the movement permission area for autonomous traveling is given to the autonomous driving vehicle, when it is determined that the autonomous driving vehicle has arrived near the target parking space or when the notification of the start of the automated valet parking for the target parking space is sent from the autonomous driving vehicle, since the instruction about the movement permission area for automated valet parking is given to the autonomous driving vehicle, the instructions about the movement permission area for autonomous traveling and the movement permission area for automated valet parking corresponding to the status of the autonomous driving vehicle can be appropriately given.

According to still another aspect of the present disclosure, there is provided an autonomous driving vehicle that receives an instruction related to the automated valet parking from the above-described automated valet parking system. The vehicle includes an automated valet parking executable determination unit configured to determine whether or not the automated valet parking of the autonomous driving vehicle for the target parking space by moving in the movement permission area for automated valet parking is executable based on vehicle body information of the autonomous driving vehicle and the movement permission area for automated valet parking when an instruction about the movement permission area for automated valet parking is received from the second movement permission area instruction unit of the automated valet parking system. The automated valet parking executable determination unit is configured to, when it is determined that the automated valet parking of the autonomous driving vehicle for the target parking space by moving in the movement permission area for automated valet parking is not executable, notify the automated valet parking system that the automated valet parking for the target parking space is not executable.

In accordance with the autonomous driving vehicle according to still another aspect of the present disclosure, it is possible to appropriately give an instruction about the movement permission area for autonomous traveling and the movement permission area for automated valet parking corresponding to the status of the autonomous driving vehicle from the automated valet parking system. In this autonomous driving vehicle, it is determined whether or not the automated valet parking of the autonomous driving vehicle for the target parking space by moving in the movement permission area for automated valet parking is executable, and it is possible to notify the automated valet parking system that the automated valet parking for the target parking space is not executable when it is determined that the automated valet parking is not executable.

In accordance with each aspect of the present disclosure, it is possible to appropriately give an instruction about the movement permission area for autonomous traveling and the movement permission area for automated valet parking corresponding to the status of the autonomous driving vehicle.

DETAILED DESCRIPTION

Hereinafter, the embodiment of the present disclosure will be described with reference to the drawings.

Figure 1:
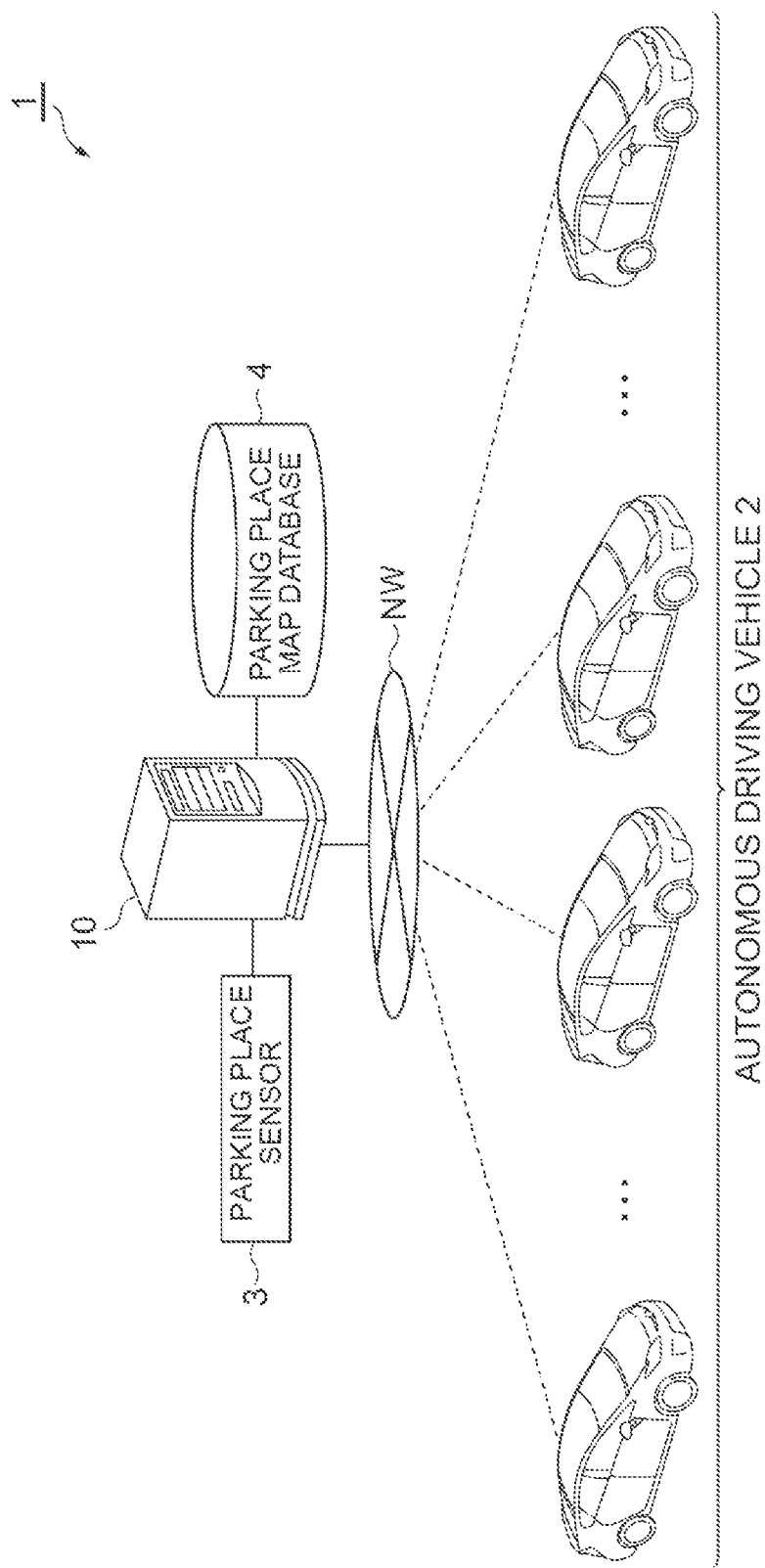
FIG. 1 is a block diagram for describing an automated valet parking system according to an embodiment.

FIG. 1 is a block diagram illustrating an automated valet parking system 1 according to the embodiment. The automated valet parking system (AVPS) 1 illustrated in FIG. 1 is a system for performing automated valet parking of autonomous driving vehicles 2 in a parking place.

The automated valet parking is a service that allows a driverless autonomous driving vehicle 2, after a user (occupant) has got out of the vehicle at a drop-off area in a parking place, to travel on a target route according to an instruction from the parking place side, and that automatically parks the vehicle in a target parking space in the parking place. The target parking space is a parking space as a parking position of the autonomous driving vehicle 2. The target route is a route in the parking place where the autonomous driving vehicle 2 travels to reach the target parking space.

In the automated valet parking, the autonomous traveling of the autonomous driving vehicle 2 and the automated valet parking of the autonomous driving vehicle 2 are performed. The autonomous traveling is vehicle control for causing the vehicle to travel on a traveling path of the parking place along the target route toward the target parking space. The automated valet parking is a vehicle control for causing the autonomous driving vehicle 2 to be parked in the target parking space.

After the autonomous driving vehicle 2 is parked, the automated valet parking system 1 causes the parked autonomous driving vehicle 2 to be picked up in response to a pick up request (leaving parking space request) from the occupant. The automated valet parking system 1 causes the autonomous driving vehicle 2 to be picked up to autonomously travel toward a target parking space for picking up set in a parking frame (standby frame) of a pick up area, to be automatically parked in the target parking space for picking up, and to be on standby until the occupant arrives.

The parking place may be a parking space dedicated to automated valet parking, or may also serve as a parking place for general vehicles that are not targets of automated valet parking. A part of the parking place for general vehicles may be used as an area dedicated to automated valet parking. The parking place may be an indoor parking place or an outdoor parking place.

[Configuration of Automated Valet Parking System]

Next, a configuration of the automated valet parking system 1 will be described with reference to the drawings. As illustrated in FIG. 1, the automated valet parking system 1 includes a parking place control server 10. The parking place control server 10 is a server for managing the parking place.

The parking place control server 10 is configured to be able to communicate with the autonomous driving vehicles 2 via a network NW. The autonomous driving vehicle 2 will be described in detail later. The parking place control server 10 may be provided in the parking place or may be provided in a facility away from the parking place. The parking place control server 10 may include a plurality of computers provided at different positions. The parking place control server 10 is connected to a parking place sensor 3 and a parking place map database 4.

The parking place sensor 3 is a sensor for recognizing a status in the parking place. The parking place sensor 3 includes, for example, a surveillance camera for detecting a position of the autonomous driving vehicle 2 in the parking place. The surveillance camera is provided on a ceiling or a wall of the parking place, and captures an image of the autonomous driving vehicle 2 in the parking place. The surveillance camera transmits the captured image to the parking place control server 10.

The parking place sensor 3 may include an empty sensor for detecting whether or not there is the parked vehicle in the parking frame (whether or not the parking frame is occupied or empty). The empty sensor may be provided for each parking frame, or may be provided on a ceiling or the like to be able to monitor a plurality of parking frames by one sensor. The configuration of the empty sensor is not particularly limited, and a known configuration can be employed. The empty sensor may be a pressure sensor, a radar sensor or a sonar sensor using radio waves, or a camera. The empty sensor transmits empty information in the parking frame to the parking place control server 10.

The parking place map database 4 is a database that stores parking place map information. The parking place map information includes positional information of the parking frame in the parking place and information on the traveling path in the parking place. The parking place map information may include positional information of a landmark used for position recognition of the autonomous driving vehicle 2. The landmark includes at least one of a white line, a pole, a safety cone, a pillar of the parking place, and the like.

Figure 2:
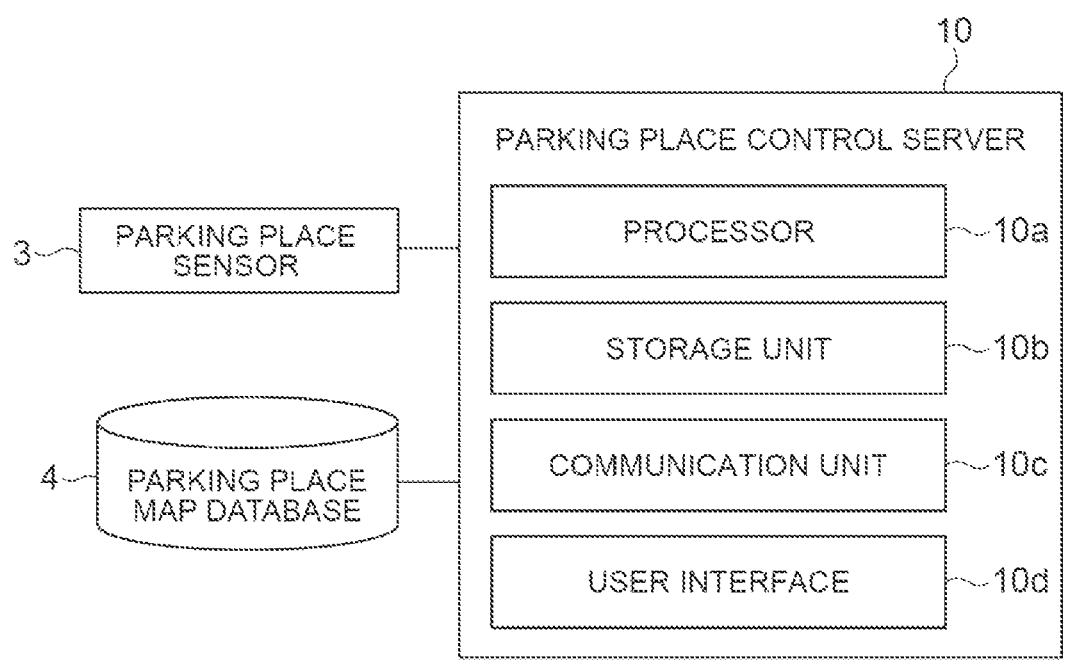
FIG. 2 is a block diagram illustrating an example of a hardware configuration of a parking place control server.

A hardware configuration of the parking place control server 10 will be described. FIG. 2 is a block diagram illustrating an example of the hardware configuration of the parking place control server. As illustrated in FIG. 2, the parking place control server 10 is a general computer that includes a processor 10a, a storage unit 10b, a communication unit 10c, and a user interface 10d.

The processor 10a operates various operating systems to control the parking place control server 10. The processor 10a is an arithmetic logic unit such as a central processing unit (CPU) including a control device, an arithmetic device, a register, and the like. The processor 10a controls the storage unit 10b, the communication unit 10c, and the user interface 10d. The storage unit 10b is, for example, a recording medium including at least one of a read only memory (ROM), a random access memory (RAM), a hard disk drive (HDD), and a solid state drive (SSD).

The communication unit 10c is a communication device for performing wireless communication through a network, such as the network NW. As the communication unit 10c, a network device, a network controller, a network card, or the like can be used. The parking place control server 10 communicates with the autonomous driving vehicles 2 by using the communication unit 10c. The user interface 10d is an input and output unit of the parking place control server 10 for an administrator of the parking place control server 10 or the like. The user interface 10d includes an output device such as a display and a speaker, and an input device such as a touch panel.

Figure 3:
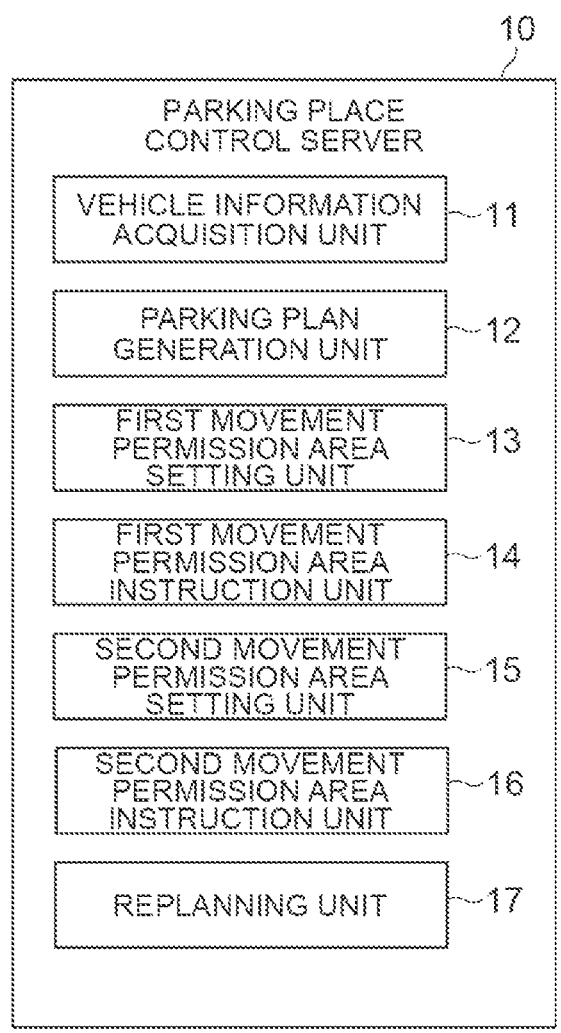
FIG. 3 is a diagram illustrating an example of a functional configuration of the parking place control server.

Next, a functional configuration of the parking place control server 10 will be described. FIG. 3 is a diagram illustrating an example of the functional configuration of the parking place control server. As illustrated in FIG. 3, the parking place control server 10 includes a vehicle information acquisition unit 11, a parking plan generation unit 12, a first movement permission area setting unit 13, a first movement permission area instruction unit 14, and a second movement permission area setting unit 15, a second movement permission area instruction unit 16, and a replanning unit 17.

The vehicle information acquisition unit 11 acquires vehicle information of the autonomous driving vehicle 2 through communication with the autonomous driving vehicle 2 in the parking place. The vehicle information includes identification information of the autonomous driving vehicle 2 and positional information of the autonomous driving vehicle 2 in the parking place. The identification information may be any information as long as information can specify each of the autonomous driving vehicles 2. The identification information may be an identification number (ID number), a vehicle number, a reservation number for automated valet parking, or the like.

The vehicle information may include a type of the autonomous driving vehicle 2 or may include a vehicle number separately from the identification information. The vehicle information may include vehicle entrance reservation information such as a vehicle entrance reservation time, or may include a scheduled pick-up time (scheduled leaving parking space time or scheduled reaching target parking space for picking up). The vehicle information may include vehicle body information such as a turning radius, a size, and a vehicle width of the autonomous driving vehicle 2, or may include information regarding an autonomous driving function of the autonomous driving vehicle 2. The information regarding the autonomous driving function may include version information of the autonomous driving function.

The vehicle information may include recognition results of a traveling state of the autonomous driving vehicle 2 and an external environment. The recognition of the traveling state and the external environment will be described later. The vehicle information may include information on remaining mileage or remaining fuel of the autonomous driving vehicle 2. The vehicle information may include a distinction as to whether or not the autonomous driving vehicle 2 is in an autonomous traveling mode or an automated valet parking mode.

The vehicle information acquisition unit 11 continuously acquires the vehicle information from the autonomous driving vehicle 2 during automated valet parking. While the autonomous driving vehicle 2 is parked, the vehicle information acquisition unit 11 may interrupt the acquisition of the vehicle information, or may periodically acquire the vehicle information.

The vehicle information acquisition unit 11 recognizes a status of the autonomous driving vehicle 2 during automated valet parking based on the acquired vehicle information. The status of the autonomous driving vehicle 2 includes the position of the autonomous driving vehicle 2 in the parking place. The status of the autonomous driving vehicle 2 may include a vehicle speed of the autonomous driving vehicle 2, may include a yaw rate of the autonomous driving vehicle 2, and may include a distance between the autonomous driving vehicle 2 and another surrounding vehicle.

The parking plan generation unit 12 generates a parking plan, which is a traveling plan for parking the autonomous driving vehicle 2, based on the vehicle information acquired by the vehicle information acquisition unit 11. The parking plan includes a target parking space in which the autonomous driving vehicle 2 is parked and a target route to the target parking space. For example, when a vehicle entrance request is received from the autonomous driving vehicle 2 that has entered the parking place, the parking plan generation unit 12 starts generating the parking plan. The vehicle entrance request may be issued from a user terminal of the occupant instead of the autonomous driving vehicle 2.

The parking plan generation unit 12 sets the target parking space based on an empty status of the parking frame in the parking place recognized from the detection result of the parking place sensor 3. The parking plan generation unit 12 sets a target parking space for a parking frame preset in the parking place. The parking plan generation unit 12 may set an appropriate target parking space corresponding to the size of the autonomous driving vehicle 2 based on the vehicle body information of the autonomous driving vehicle 2.

The parking plan generation unit 12 sets a target route toward the target parking space from a current position of the autonomous driving vehicle 2 based on the positional information of the autonomous driving vehicle 2 acquired by the vehicle information acquisition unit 11, positional information of the target parking space, and the parking place map information of the parking place map database 4.

The parking plan generation unit 12 sets a target route on the traveling path in the parking place. The target route does not necessarily have to be a shortest distance, and a route that does not interfere with or has less interference with a target route of another autonomous driving vehicle 2 may be preferentially selected. A method for setting the target route is not particularly limited, and various well-known methods can be employed. The target route may be set by the first movement permission area setting unit 13 to be described later.

The parking plan generation unit 12 may generate a vehicle speed plan for the autonomous driving vehicle 2. The parking plan generation unit 12 may control the vehicle speed of the autonomous driving vehicle 2 by calculating a target vehicle speed for each set position preset on the target route (on the traveling path) and reporting positional information of the set position and the vehicle speed plan including the target vehicle speed. For example, the set position is virtually set for the traveling path at regular intervals. The set position may be set at an intersection point of the traveling path. The parking plan generation unit 12 may update the target vehicle speed at the set position based on the traveling statuses of another autonomous driving vehicle 2 and the general vehicle.

Alternatively, the parking plan generation unit 12 may appropriately give an instruction about a target vehicle speed corresponding to a change in the position of the autonomous driving vehicle 2 without generating the vehicle speed plan. The parking plan generation unit 12 may instruct the autonomous driving vehicle 2 about an upper limit of the vehicle speed to, and may cause the autonomous driving vehicle 2 to adjust the vehicle speed.

The first movement permission area setting unit 13 sets a movement permission area for autonomous traveling in which the autonomous driving vehicle 2 travels toward the target parking space. The movement permission area for autonomous traveling is an area set for autonomous traveling of the autonomous driving vehicle 2. The autonomous driving vehicle 2 executes autonomous traveling such that the autonomous driving vehicle does not deviate from the movement permission area for autonomous traveling. The movement permission area for autonomous traveling is an area in which the target parking space includes a part of the traveling path along which the autonomous driving vehicle 2 reaches and does not include the target parking space.

The first movement permission area setting unit 13 sets the movement permission area for autonomous traveling based on the positional information of the autonomous driving vehicle 2, the positional information of the target parking space, and the parking place map information. When the target route is set, the first movement permission area setting unit 13 sets the movement permission area for autonomous traveling along the target route. The movement permission area for autonomous traveling may be set as an area longer than the target route, or may be set as an area shorter than the target route.

Figure 4:
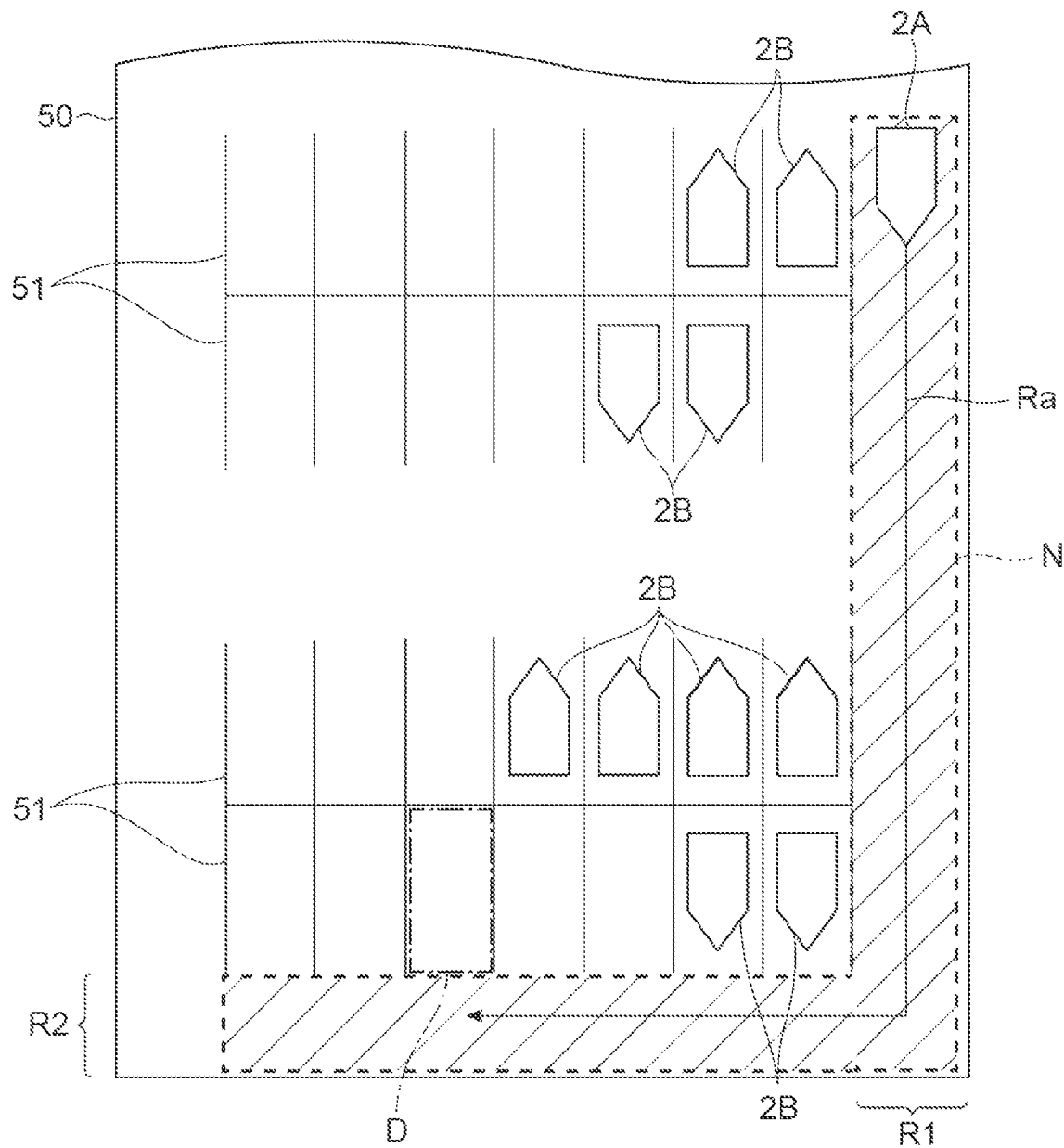
FIG. 4 is a diagram illustrating an example of a movement permission area for autonomous traveling.

Here, FIG. 4 is a diagram illustrating an example of the movement permission area for autonomous traveling. FIG. 4 illustrates a parking place 50, parking frames 51, a target parking space D, an autonomous driving vehicle 2A that performs autonomous traveling, autonomous driving vehicles 2B that are parked, a target route Ra of the autonomous driving vehicle 2A, and a movement permission area N for autonomous traveling of the autonomous driving vehicle 2A. A traveling path R1 through which the autonomous driving vehicle 2A is traveling and a traveling path R2 in contact with the target parking space D are illustrated. In the following description, the autonomous driving vehicle 2A means one distinct autonomous driving vehicle.

As illustrated in FIG. 4, the movement permission area N for autonomous traveling is an area set on the traveling path R1 and the traveling path R2 along the target route Ra and does not include the target parking space D. A starting end of the movement permission area N for autonomous traveling can be, for example, a current position of the autonomous driving vehicle 2A. A trailing end of the movement permission area N for autonomous traveling may be set beyond the target parking space D, or may be set at the entrance of the target parking space D (a position in contact with the target parking space D on the traveling path R2). Alternatively, the movement permission area N for autonomous traveling may include all of the traveling path R1 and the traveling path R2. The movement permission area N for autonomous traveling may be set such that the autonomous driving vehicle 2A travels toward the target parking space D without deviating from the traveling path in the parking place. The movement permission area N for autonomous traveling may be an area including the target route Ra starting from the autonomous driving vehicle 2A. Alternatively, the movement permission area N for autonomous traveling may include a plurality of areas that are updated according to the traveling of the autonomous driving vehicle 2A. In this case, the plurality of areas are provided to be arranged along the target route Ra.

When the first movement permission area setting unit 13 sets the movement permission area for autonomous traveling, the first movement permission area instruction unit 14 instructs the autonomous driving vehicle 2 about the movement permission area for autonomous traveling. The first movement permission area instruction unit 14 may instruct the autonomous driving vehicle 2 by combining the target parking space and the target route. The first movement permission area instruction unit 14 may not instruct the autonomous driving vehicle 2A about the target route, but may give an instruction about only the target parking space and the movement permission area for autonomous traveling.

When it is determined that the autonomous driving vehicle 2 has arrived near the target parking space or when the autonomous driving vehicle 2 notifies the start of the automated valet parking for the target parking space, the second movement permission area setting unit 15 sets a movement permission area for automated valet parking.

Whether or not the autonomous driving vehicle has arrived near the target parking space is determined, for example, when the autonomous driving vehicle 2 reaches a preset start position of the automated valet parking near the target parking space. As an example, the start position of the automated valet parking can be a position on the traveling path in front of the entrance of the target parking space (a boundary line where the target parking space and the traveling path are in contact with each other). Whether or not the autonomous driving vehicle has arrived near the target parking space may be determined when a distance between the target parking space and the autonomous driving vehicle 2 becomes less than a certain distance threshold value. The method for determining whether or not the autonomous driving vehicle has arrived near the target parking space is not particularly limited, and various well-known methods can be employed. The case where the autonomous driving vehicle 2 notifies the start of the automated valet parking for the target parking space is a case where the autonomous driving vehicle 2 determines the start of the automated valet parking. Details will be described later.

The movement permission area for automated valet parking is an area set for the automated valet parking of the autonomous driving vehicle 2. The autonomous driving vehicle 2 executes the automated valet parking for the target parking space by moving such that the autonomous driving vehicle does not deviate from the movement permission area for automated valet parking. The movement permission area for automated valet parking includes the target parking space and a part of the traveling path near the target parking space.

The second movement permission area setting unit 15 sets the movement permission area for automated valet parking based on the positional information of the autonomous driving vehicle 2, the positional information of the target parking space, and the parking place map information. The second movement permission area setting unit 15 may set the movement permission area for automated valet parking including a head swing region in which the autonomous driving vehicle 2 is parked in the target parking space by moving backward.

The second movement permission area setting unit 15 may set the movement permission area for automated valet parking including a following vehicle entrance prohibition region in which the entrance of a following autonomous driving vehicle that is performing autonomous traveling and follows the autonomous driving vehicle 2 that is an instruction target of the movement permission area for automated valet parking is prohibited, and may perform control such that the following autonomous driving vehicle does not enter the movement permission area for automated valet parking.

Figure 5:
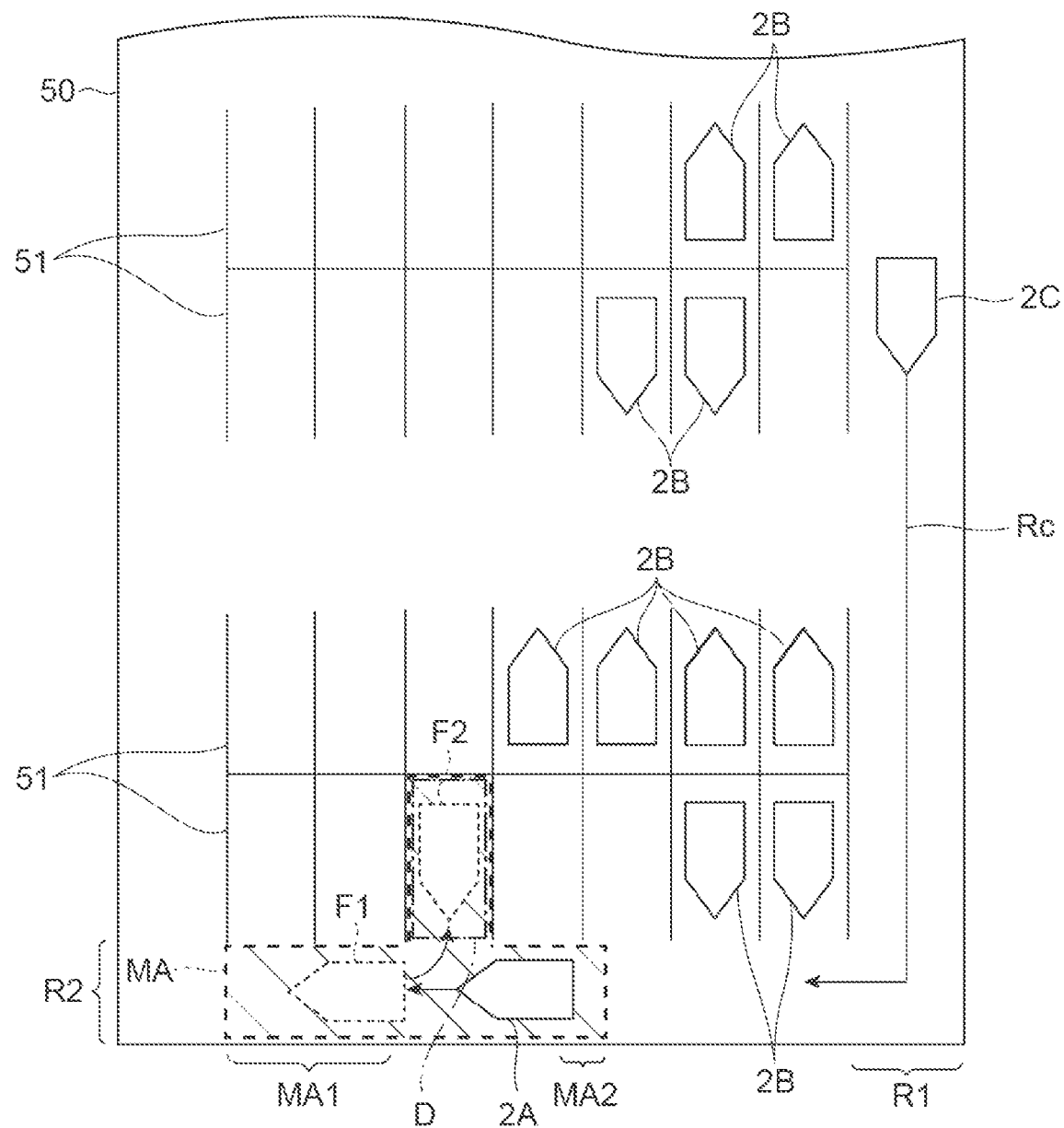
FIG. 5 is a diagram illustrating an example of a movement permission area for automated valet parking.

Here, FIG. 5 is a diagram illustrating an example of the movement permission area for automated valet parking. FIG. 5 illustrates a movement permission area MA for automated valet parking, a head swing region MA1, a following vehicle entrance prohibition region MA2, a following autonomous driving vehicle 2C, and a target route Rc of the following autonomous driving vehicle 2C. As illustrated in FIG. 5, the second movement permission area setting unit 15 sets the movement permission area MA for automated valet parking including the target parking space D and a part of the traveling path R2 near the target parking space D.

The movement permission area MA for automated valet parking includes the head swing region MA1. As an example, the head swing region MA1 is set at a position on the traveling path R2 that exceeds the target parking space D in a traveling direction of the autonomous driving vehicle 2A. The autonomous driving vehicle 2A can execute automated valet parking by moving forward to enter the head swing region MA1 as indicated by a broken line F1 in FIG. 5 and then moving backward in the target parking space D as indicated by a broken line F2.

The movement permission area MA for automated valet parking includes the following vehicle entrance prohibition region MA2. The following vehicle entrance prohibition region MA2 is set at a position behind the autonomous driving vehicle 2A. The automated valet parking system 1 controls the vehicle speed of the following autonomous driving vehicle 2C such that the following autonomous driving vehicle 2C does not enter the following vehicle entrance prohibition region MA2 of the autonomous driving vehicle 2A (movement permission area MA for automated valet parking). The automated valet parking system 1 may prohibit the following autonomous driving vehicle 2C from entering the following vehicle entrance prohibition region MA2 of the autonomous driving vehicle 2A (movement permission area MA for automated valet parking) by setting the movement permission area for autonomous traveling of the following autonomous driving vehicle 2C not to overlap with the movement permission area MA for automated valet parking of the autonomous driving vehicle 2A.

The second movement permission area setting unit 15 may set a movement permission area for automated valet parking including a turn-back region in which the autonomous driving vehicle 2 is parked in the target parking space by turning back. The turn-back region is a region used for the autonomous driving vehicle 2 that performs automated valet parking to fit in the target parking space by turn-back movement when the autonomous driving vehicle does not fit in the target parking space by moving forward once.

Figure 6A:
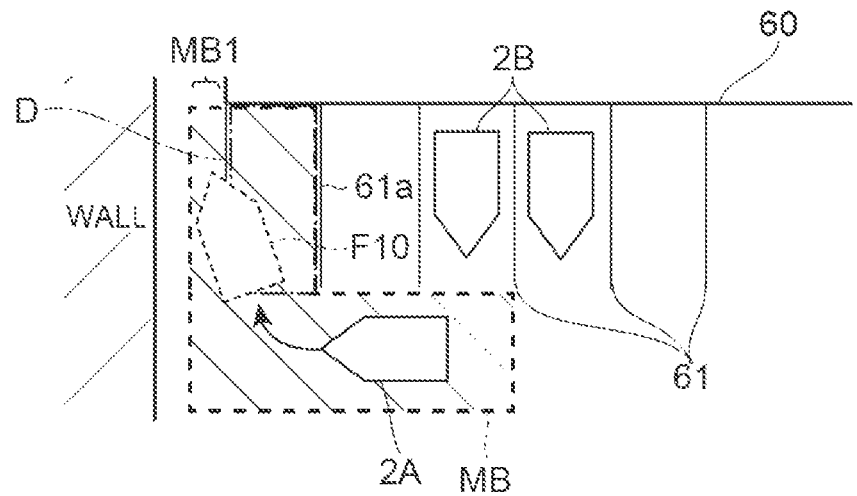
FIG. 6A is a diagram illustrating an example of a movement permission area for automated valet parking including a turn-back region.

FIG. 6A is a diagram illustrating an example of the movement permission area for automated valet parking including the turn-back region. FIG. 6A illustrates a parking place 60, parking frames 61, and a movement permission area MB for automated valet parking. The parking frame that is a target of the target parking space D is set as a target parking frame 61a.

In FIG. 6A, a left side of the target parking frame 61a (in front of the autonomous driving vehicle 2A) in which the target parking space D is set is not a parking frame but a pedestrian passage, and there is a wall ahead of the target parking frame. In FIG. 6A, since a length of a traveling path on the left side of the target parking frame 61a (in front of the vehicle) is insufficient, the autonomous driving vehicle 2A cannot be parked by back-in parking due to head swing.

As illustrated in FIG. 6A, the movement permission area MB for automated valet parking includes a turn-back region MB1. The turn-back region MB1 is set as a region that protrudes beyond the target parking space D (target parking frame 61a). Here, the turn-back region MB1 is set to be expanded in a width direction of the target parking frame 61a from the target parking space D. The movement permission area MB for automated valet parking is set as an area including the turn-back region MB1 expanded in the width direction of the target parking frame 61a from the target parking space D.

Figure 6B:
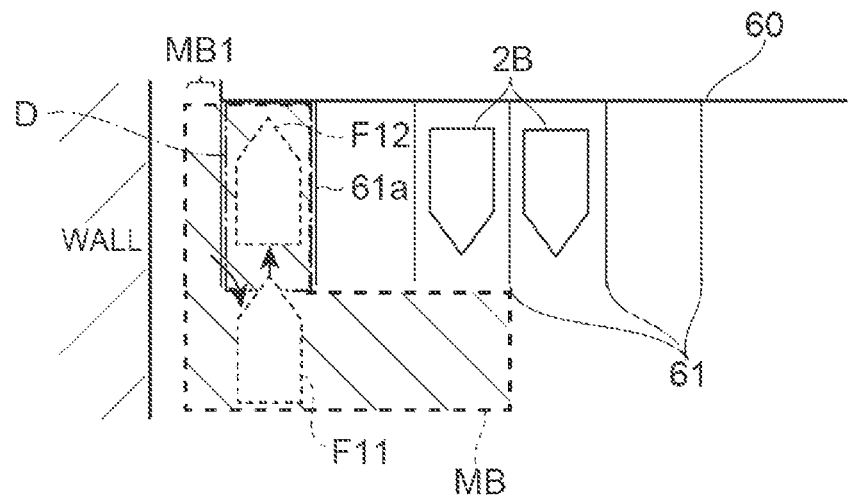
FIG. 6B is a diagram for describing an example of automated valet parking by turn-back movement.

Subsequently, the automated valet parking in the target parking space D by the turn-back movement of the autonomous driving vehicle 2A will be described with reference to FIGS. 6A and 6B. FIG. 6B is a diagram for describing an example of the automated valet parking by the turn-back movement.

When the autonomous driving vehicle 2A cannot be parked in the target parking space D by moving forward once due to restrictions such as turning performance or a size of a vehicle body of the autonomous driving vehicle 2A, the autonomous driving vehicle moves forward such that a part of the autonomous driving vehicle protrudes from the target parking space D and enters the turn-back region MB1 as indicated by a broken line F10 in FIG. 6A. Thereafter, the autonomous driving vehicle 2A moves to a position facing the target parking space D by moving backward (turn-back movement) by reversely rotating a steering direction as indicated by a broken line F11 in FIG. 6B, and is parked in the target parking space D by moving forward as indicated by a broken line F12 in FIG. 6B.

When the second movement permission area setting unit 15 recognizes that there is a general vehicle parked to protrude from the parking frame of the parking place from the detection result of the parking place sensor provided in the parking place, the movement permission area for automated valet parking may be set not to include the general vehicle. The general vehicle is, for example, a vehicle that does not have an autonomous driving function. The general vehicle includes a vehicle that has an autonomous driving function but is not the target of the automated valet parking due to a status such as a communication failure with the parking place control server 10. Since the general vehicle cannot execute the automated valet parking by the parking place control server 10, a driver manually parks the vehicle.

Figure 7A:
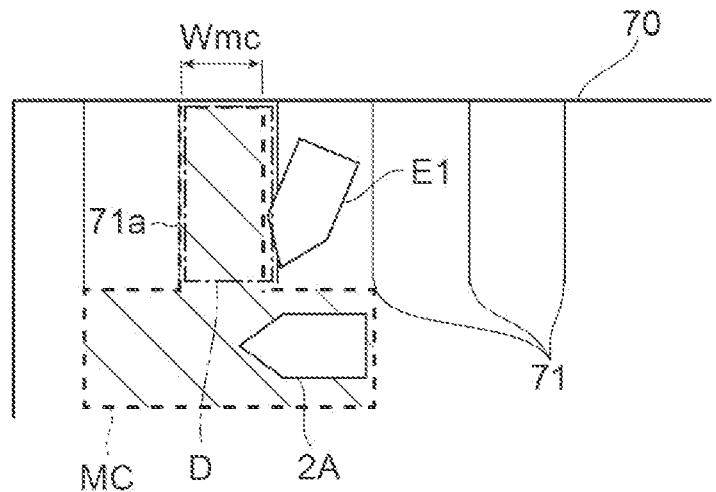
FIG. 7A is a diagram illustrating an example of a movement permission area for automated valet parking that does not include a general vehicle parked to protrude from a parking frame.

FIG. 7A is a diagram illustrating an example of the movement permission area for automated valet parking that does not include the general vehicle parked to protrude from the parking frame. FIG. 7A illustrates a parking place 70, parking frames 71, a target parking frame 71a that is the target of the target parking space D, a general vehicle E1, a movement permission area MC for automated valet parking, and a width Wmc of the movement permission area MC for automated valet parking in the target parking frame 71a. The general vehicle E1 is parked to protrude from an adjacent parking frame to the target parking frame 71a.

In the status illustrated in FIG. 7A, the second movement permission area setting unit 15 sets the movement permission area MC for automated valet parking not to include the general vehicle E1 parked to protrude from the target parking frame 71a. That is, the width Wmc of the movement permission area MC for automated valet parking in the target parking frame 71a is set to be narrower than a width of the target parking frame 71a not to include the general vehicle E1. The second movement permission area setting unit 15 sets the movement permission area MC for automated valet parking not to include the general vehicle E1 based on positional information of the general vehicle E1 detected by the parking place sensor 3. The second movement permission area setting unit 15 may set the movement permission area MC for automated valet parking based on positional information of the general vehicle E1 as an external environment transmitted from the autonomous driving vehicle 2A.

When the movement permission area for automated valet parking is set by the second movement permission area setting unit 15, the second movement permission area instruction unit 16 instructs the autonomous driving vehicle 2 about the movement permission area for automated valet parking. The second movement permission area instruction unit 16 may instruct the autonomous driving vehicle 2 about an automated valet parking mode together with the movement permission area for automated valet parking. The automated valet parking mode is, for example, head-in parking, back-in parking with head swing, or parking by turn-back movement.

The replanning unit 17 replans the parking plan of the autonomous driving vehicle 2 when the autonomous driving vehicle 2 notifies that the automated valet parking for the target parking space by moving in the movement permission area for automated valet parking is not executable after the instruction about the movement permission area for automated valet parking is given to the autonomous driving vehicle 2 by the second movement permission area instruction unit 16. As a request to change the target parking space, a notification indicating that the automated valet parking is not executable may be given. The processing on the autonomous driving vehicle 2 side will be described later.

The replanning unit 17 replans to change the target parking space. The replanning unit 17 may replan the parking plan including a target route from a current position of the autonomous driving vehicle 2 to a new target parking space.

Figure 7B:
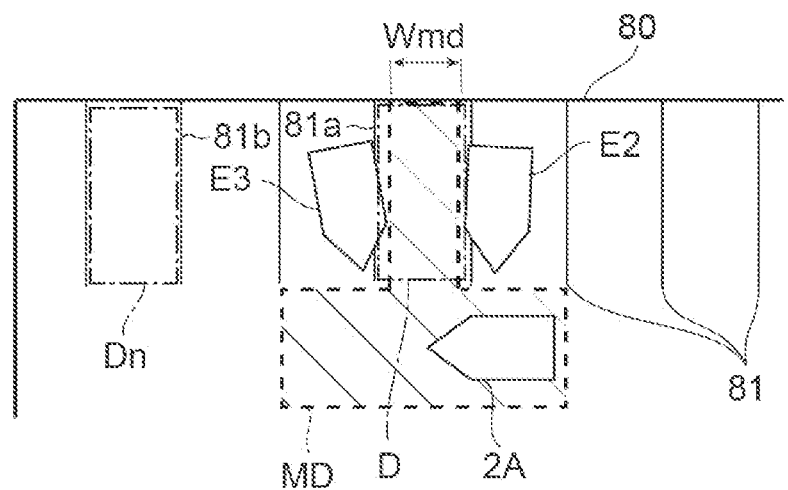
FIG. 7B is a diagram for describing an example of a status in which an autonomous driving vehicle determines that automated valet parking for a target parking space by moving in a movement permission area for automated valet parking is not executable.

FIG. 7B is a diagram for describing an example of a status in which the autonomous driving vehicle determines that the automated valet parking for the target parking space by moving in the movement permission area for automated valet parking is not executable performed. FIG. 7B illustrates a parking place 80, parking frames 81, a target parking frame 81a that is the target of the target parking space D, general vehicles E2 and E3, the movement permission area MD for automated valet parking, and a width Wmd of the movement permission area MD for automated valet parking in the target parking frame 81*a*. A new target parking space Dn due to the replanning and a target parking frame 81*b* of the new target parking space Dn are illustrated.

In the status illustrated in FIG. 7B, the general vehicle E2 and the general vehicle E3 are parked to protrude from left and right sides of the target parking frame 81*a* in the target parking frame 81*a*, respectively. Thus, the width Wmd of the movement permission area MD for automated valet parking in the target parking frame 81*a* is narrowed. When it is determined that the width of the autonomous driving vehicle 2A is narrower than the width Wmd or a sufficient margin is not secured between the width of the autonomous driving vehicle and the width Wmd, the autonomous driving vehicle notifies the parking place control server 10 that the automated valet parking for the target parking space D by the movement in the movement permission area MD for automated valet parking is not executable.

When the autonomous driving vehicle 2A notifies that the automated valet parking for the target parking space by moving in the movement permission area for autonomous traveling is not executable, the replanning unit 17 replans the parking plan of the autonomous driving vehicle 2A. For example, the replanning unit 17 sets the new target parking space Dn in the target parking frame 81*b* two apart, and instructs the autonomous driving vehicle 2A about the parking plan.

The replanning unit 17 may cause the first movement permission area setting unit 13 to set the new movement permission area for automated valet parking in order to perform autonomous traveling up to the new target parking space Dn, and may cause the first movement permission area instruction unit 14 to instruct the autonomous driving vehicle 2A about the parking plan. At a timing at which the autonomous driving vehicle 2A performs automated valet parking, an instruction to set the new movement permission area for automated valet parking by the second movement permission area setting unit 15 and an instruction to set the new movement permission area for automated valet parking by the second movement permission area instruction unit 16 are given.

[Configuration of Autonomous Driving Vehicle]

Figure 8:
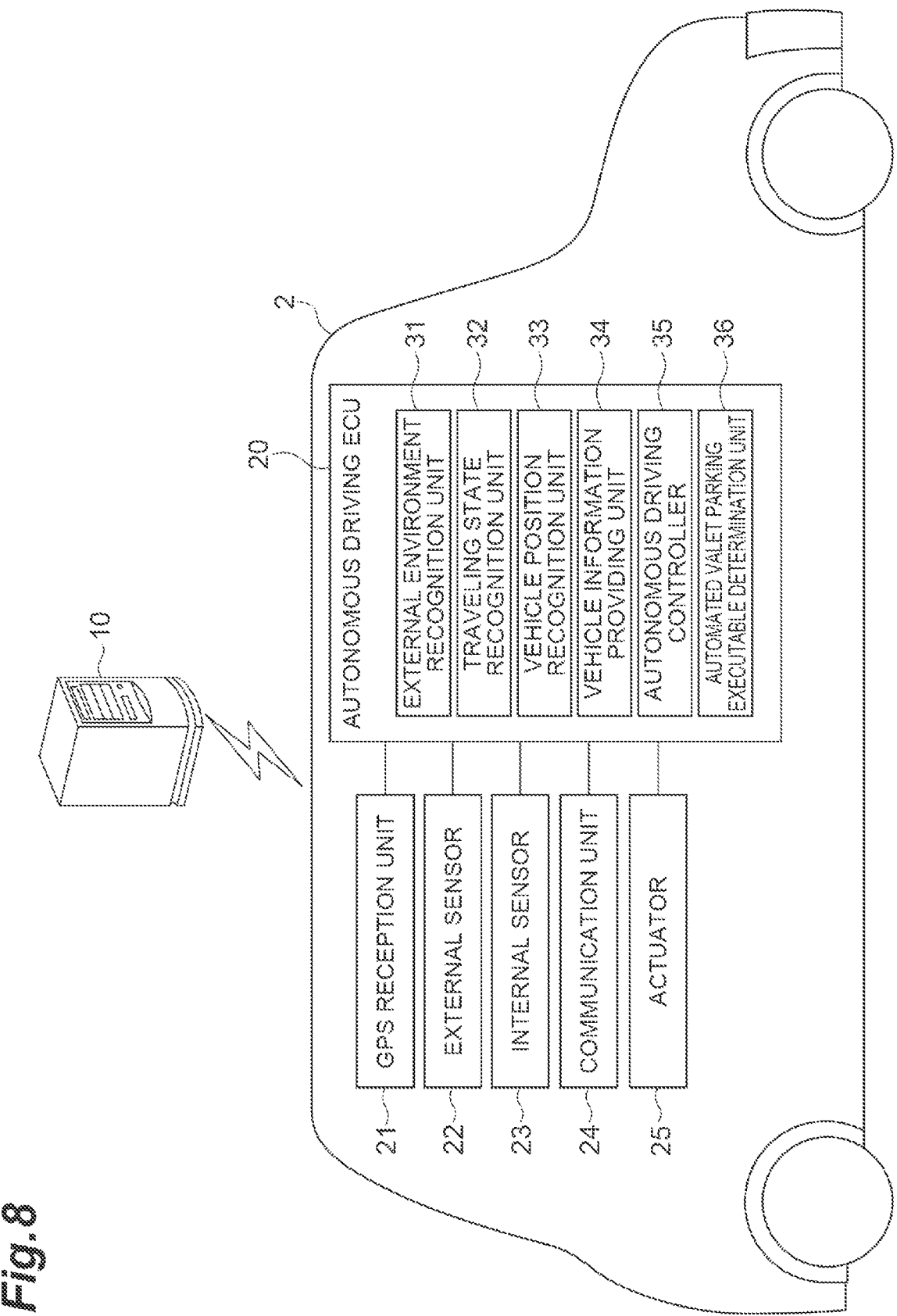
FIG. 8 is a block diagram illustrating an example of the autonomous driving vehicle.

Next, an example of a configuration of the autonomous driving vehicle 2 according to the present embodiment (autonomous driving vehicle that receives an instruction relating to the automated valet parking from the automated valet parking system 1). FIG. 8 is a block diagram illustrating an example of the autonomous driving vehicle 2. In the present embodiment, the autonomous driving vehicle 2 is not included in the automated valet parking system 1.

As illustrated in FIG. 8, the autonomous driving vehicle 2 includes an autonomous driving ECU 20 as an example. The autonomous driving ECU 20 is an electronic control unit including a CPU, a ROM, a RAM, and the like. In the autonomous driving ECU 20, for example, a program recorded in the ROM is loaded into the RAM, and various functions are implemented by the CPU executing the program loaded into the RAM. The autonomous driving ECU 20 may include a plurality of electronic units.

The autonomous driving ECU 20 is connected to a GPS reception unit 21, an external sensor 22, an internal sensor 23, a communication unit 24, and an actuator 25.

The GPS reception unit 21 measures a position of the autonomous driving vehicle 2 (for example, the latitude and longitude of the autonomous driving vehicle 2) by receiving signals from a plurality of GPS satellites. The GPS reception unit 21 transmits the measured positional information of the autonomous driving vehicle 2 to the autonomous driving ECU 20. A global navigation satellite system (GNSS) reception unit may be used instead of the GPS reception unit 21.

The external sensor 22 is an in-vehicle sensor that detects an external environment of the autonomous driving vehicle 2. The external sensor 22 includes at least a camera. The camera is an imaging device that captures an image of an external environment of the autonomous driving vehicle 2. The camera is provided, for example, behind a windshield of the autonomous driving vehicle 2 and captures an image in front of the vehicle. The camera transmits imaging information on the external environment of the autonomous driving vehicle 2 to the autonomous driving ECU 20. The camera may be a monocular camera or a stereo camera. A plurality of cameras may be provided, and in addition to the front of the autonomous driving vehicle 2, the right and left sides and the rear may be imaged.

The external sensor 22 may include a radar sensor. The radar sensor is a detection device that detects an object around the autonomous driving vehicle 2 using radio waves (for example, millimeter waves) or light. The radar sensor includes, for example, a millimeter wave radar or a light detection and ranging (LIDAR). The radar sensor transmits a radio wave or light to the vicinity of the autonomous driving vehicle 2 and detects the object by receiving the radio wave or light reflected by the object. The radar sensor transmits the detected object information to the autonomous driving ECU 20. The external sensor 22 may include a sonar sensor that detects a sound outside the autonomous driving vehicle 2.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, wheel speed sensors that are provided for wheels of the autonomous driving vehicle 2 or for drive shafts that rotate integrally with the wheels and that detect rotation speeds of the respective wheels can be used. The vehicle speed sensor transmits the detected vehicle speed information (wheel speed information) to the autonomous driving ECU 20.

The acceleration sensor is a detector that detects the acceleration of the autonomous driving vehicle 2. The acceleration sensor includes, for example, a front-rear acceleration sensor that detects an acceleration in a front-rear direction of the autonomous driving vehicle 2. The acceleration sensor may include a lateral acceleration sensor that detects a lateral acceleration of the autonomous driving vehicle 2. The acceleration sensor transmits, for example, acceleration information of the autonomous driving vehicle 2 to the autonomous driving ECU 20. The yaw rate sensor is a detector that detects a yaw rate (rotational angular velocity) of the center of gravity of the autonomous driving vehicle 2 around a vertical axis. As the yaw rate sensor, for example, a gyro sensor can be used. The yaw rate sensor transmits the detected yaw rate information of the autonomous driving vehicle 2 to the autonomous driving ECU 20.

The communication unit 24 is a communication device that controls wireless communication with the outside of the autonomous driving vehicle 2. The communication unit 24 transmits and receives various types of information through communication with the parking place control server 10. The communication unit 24 transmits, for example, vehicle information to the parking place control server 10 and acquires information (for example, information on a landmark along a target route) needed for automated valet parking from the parking place control server 10.

The actuator 25 is a device used for controlling the autonomous driving vehicle 2. The actuator 25 includes at least a drive actuator, a brake actuator, and a steering actuator. The drive actuator controls the supply amount of air to the engine (throttle opening degree) according to a control signal from the autonomous driving ECU 20 to control a driving force of the autonomous driving vehicle 2. When the autonomous driving vehicle 2 is a hybrid vehicle, the control signal from the autonomous driving ECU 20 is input to a motor as a power source in addition to the supply amount of air to the engine, so that the driving force of the autonomous driving vehicle is controlled. When the autonomous driving vehicle 2 is an electric vehicle, the control signal from the autonomous driving ECU 20 is input to a motor as a power source, so that the driving force of the autonomous driving vehicle is controlled. The motor as the power source in these cases forms the actuator 25.

The brake actuator controls a brake system according to the control signal from the autonomous driving ECU 20 to control a braking force applied to the wheels of the autonomous driving vehicle 2. As the brake system, for example, a hydraulic brake system can be used. The steering actuator controls driving of an assist motor for controlling a steering torque in an electric power steering system according to the control signal from the autonomous driving ECU 20. Accordingly, the steering actuator controls the steering torque of the autonomous driving vehicle 2.

Next, an example of a functional configuration of the autonomous driving ECU 20 will be described. The autonomous driving ECU 20 includes an external environment recognition unit 31, a traveling state recognition unit 32, a vehicle position recognition unit 33, a vehicle information providing unit 34, an autonomous driving controller 35, and an automated valet parking executable determination unit 36.

The external environment recognition unit 31 recognizes the external environment of the autonomous driving vehicle 2 based on the detection result of the external sensor 22 (the image captured by the camera or the object information detected by the radar sensor). The external environment includes a relative position of a surrounding object with respect to the autonomous driving vehicle 2. The external environment may include a relative speed and a moving direction of the surrounding object with respect to the autonomous driving vehicle 2. The external environment recognition unit 31 recognizes other vehicles and objects such as pillars of the parking place by pattern matching or the like. The external environment recognition unit 31 may recognize a parking place gate, a parking place wall, a pole, a safety cone, and the like. In addition, the external environment recognition unit 31 may recognize driving boundaries in the parking place by white line recognition.

The traveling state recognition unit 32 recognizes the traveling state of the autonomous driving vehicle 2 based on the detection result of the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the acceleration of the autonomous driving vehicle 2 based on the vehicle speed information of the acceleration sensor. The traveling state recognition unit 32 recognizes the direction of the autonomous driving vehicle 2 based on the yaw rate information of the yaw rate sensor.

The vehicle position recognition unit 33 recognizes the position of the autonomous driving vehicle 2 in the parking place based on the parking place map information acquired from the parking place control server 10 through the communication unit 24 and the external environment recognized by the external environment recognition unit 31.

The vehicle position recognition unit 33 recognizes the position of the autonomous driving vehicle 2 in the parking place based on the positional information of the landmark in the parking place included in the parking place map information and the relative position of the landmark with respect to the autonomous driving vehicle 2 recognized by the external environment recognition unit 31. As the landmark, an object fixedly provided in the parking place can be used.

In addition, the vehicle position recognition unit 33 may recognize the position of the autonomous driving vehicle 2 by dead reckoning based on the detection result of the internal sensor 23. The vehicle position recognition unit 33 may recognize the position of the autonomous driving vehicle 2 by communicating with a beacon provided in the parking place.

The vehicle information providing unit 34 provides vehicle information to the parking place control server 10 through the communication unit 24. The vehicle information providing unit 34 provides the parking place control server 10 with vehicle information including, for example, information on the position of the autonomous driving vehicle 2 in the parking place recognized by the vehicle position recognition unit 33 at regular intervals. The vehicle information may include the recognized external status and/or traveling state of the autonomous driving vehicle 2.

The autonomous driving controller 35 executes the autonomous driving of the autonomous driving vehicle 2. The autonomous driving controller 35 generates a trajectory of the autonomous driving vehicle 2 based on, for example, the target route, the position of the autonomous driving vehicle 2, the external environment of the autonomous driving vehicle 2, and the traveling state of the autonomous driving vehicle 2. The trajectory corresponds to a travel plan for autonomous driving. The trajectory includes a path along which the vehicle travels by autonomous driving and a vehicle speed plan in autonomous driving.

The path is a trajectory on which the vehicle that is autonomously driving will travel on the target route as instructed to the automated valet parking system. The path can be, for example, data of a change in the steering angle of the autonomous driving vehicle 2 based on the position on the target route (steering angle plan). The position on the target route is, for example, a set vertical position set at predetermined intervals (for example, 1 m) in the advancing direction on the target route. The steering angle plan is data in which a target steering angle is associated with each set vertical position. The autonomous driving controller 35 generates a trajectory to pass through the center of the traveling path of the parking place along the target route, for example.

When the instruction about the parking plan (target parking space and the target route) is given from the parking plan generation unit 12 of the parking place control server 10 in the automated valet parking, the autonomous driving controller 35 performs the autonomous driving according to the parking plan. When the parking plan does not include a steering angle plan and the vehicle speed plan corresponding to the position, the autonomous driving controller 35 generates the steering angle plan and the vehicle speed plan on the autonomous driving vehicle 2 side to implement the autonomous traveling.

When the first movement permission area instruction unit 14 gives an instruction about the movement permission area for autonomous traveling, the autonomous driving controller 35 performs autonomous traveling toward the target parking space such that the autonomous driving vehicle does not to deviate from the movement permission area for autonomous traveling (autonomous traveling mode).

When the autonomous driving vehicle has arrived near the target parking space, the autonomous driving controller 35 stops and waits for an instruction from the parking place control server 10. The autonomous driving controller 35 may notify the parking place control server 10 of the arrival near the target parking space.

Alternatively, the autonomous driving controller 35 may notify the parking place control server 10 that the automated valet parking for the target parking space is started (the mode is switched from the autonomous traveling mode to the automated valet parking mode) based on a preset automated valet parking start condition. The automated valet parking start condition can be a condition for executing the automated valet parking for the target parking space. The automated valet parking start condition may be, for example, a condition in which the autonomous driving vehicle 2 has stopped within a certain distance from the target parking space, and may be a condition in which the target parking space can be appropriately recognized by the external sensor 22 of the autonomous driving vehicle 2.

When the second movement permission area instruction unit 16 gives an instruction about the movement permission area for automated valet parking, the autonomous driving controller 35 executes the automated valet parking for the target parking space by moving not to deviate from the movement permission area for automated valet parking (automated valet parking mode). The autonomous driving controller 35 may perform parking by the head swing illustrated in FIG. 5 as long as the autonomous driving vehicle is in the movement permission area for automated valet parking, may perform parking by the turn-back movement illustrated in FIGS. 6A and 6B, or may perform parking for the target parking space only by moving forward, such as when the target parking space is positioned at an end of the traveling path.

The automated valet parking executable determination unit 36 determines whether or not the automated valet parking of the autonomous driving vehicle 2 for the target parking space is executable according to an instruction from the parking place control server 10. When an instruction about the movement permission area for automated valet parking is received from the second movement permission area instruction unit 16 of the parking place control server 10, the automated valet parking executable determination unit 36 determines whether or not the automated valet parking of the autonomous driving vehicle 2 for the target parking space by moving in the movement permission area for automated valet parking is executable based on the vehicle body information (size, width, or the like) of the autonomous driving vehicle 2 and the movement permission area for automated valet parking. The vehicle body information may include turning performance.

As illustrated in FIG. 7B, for example, when the width Wmd of the movement permission area MD for automated valet parking in the target parking frame 81*a* is insufficient and the autonomous driving vehicle 2 cannot be parked, the automated valet parking executable determination unit 36 determines that the automated valet parking for the target parking space D is not executable. When the parking for the target parking space by moving in the movement permission area for automated valet parking is not executable even though the autonomous driving vehicle 2 is turned back a plurality of times due to insufficient turning performance or when the parking is not executable since the external sensor 22 detects an obstacle such as a falling object in the target parking space, the automated valet parking executable determination unit 36 may determine that the automated valet parking is not executable.

When it is determined that the automated valet parking is not executable, the automated valet parking executable determination unit 36 notifies the parking place control server 10 that the automated valet parking of the autonomous driving vehicle 2 for the target parking space by moving in the movement permission area for automated valet parking is not executable. The request to change the target parking space is performed, and thus, the automated valet parking executable determination unit 36 may notify the parking place control server 10 that the automated valet parking of the autonomous driving vehicle 2 for a current target parking space is not executable. When the instruction about the replanned target parking space is given by the parking place control server 10, the autonomous driving vehicle 2 executes the autonomous traveling and the automated valet parking for a new target parking space.

[Control Method of Automated Valet Parking System]

Figure 9A:
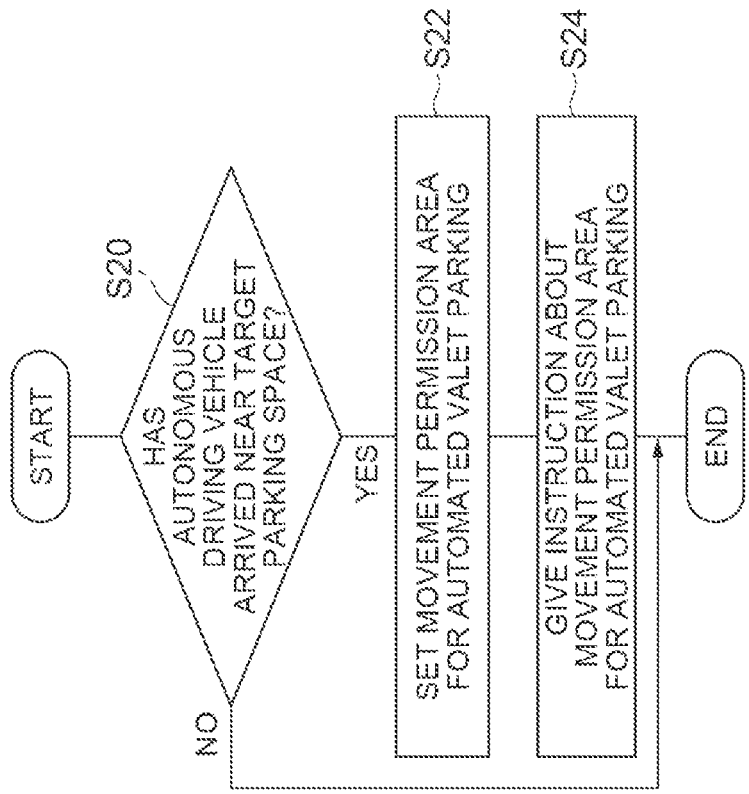
FIG. 9A is a flowchart illustrating an example of movement permission area instruction processing for autonomous traveling.

Next, an example of a control method (processing) of the automated valet parking system 1 according to the present embodiment will be described. FIG. 9A is a flowchart illustrating an example of movement permission area instruction processing for autonomous traveling. The movement permission area instruction processing for autonomous traveling is performed, for example, when the automated valet parking is started at a request of the autonomous driving vehicle 2.

As illustrated in FIG. 9A, the parking place control server 10 of the automated valet parking system 1 generates the parking plan including the target parking space and the target route by the parking plan generation unit 12 in S10. The parking plan generation unit 12 generates the parking plan based on the empty information of the parking place, the positional information of the autonomous driving vehicle 2 acquired by the vehicle information acquisition unit 11, the positional information of the target parking space, and the parking place map information of the parking place map database 4.

In S12, the parking place control server 10 sets the movement permission area for autonomous traveling by the first movement permission area setting unit 13 (first movement permission area setting step). The first movement permission area setting unit 13 sets the movement permission area for autonomous traveling based on the positional information of the autonomous driving vehicle 2, the positional information of the target parking space, and the parking place map information.

In S14, the parking place control server 10 instructs the autonomous driving vehicle 2 about the movement permission area for autonomous traveling by the first movement permission area instruction unit 14 (first movement permission area instruction step). The autonomous driving vehicle 2 performs autonomous traveling not to deviate from the movement permission area for autonomous traveling.

Figure 9B:
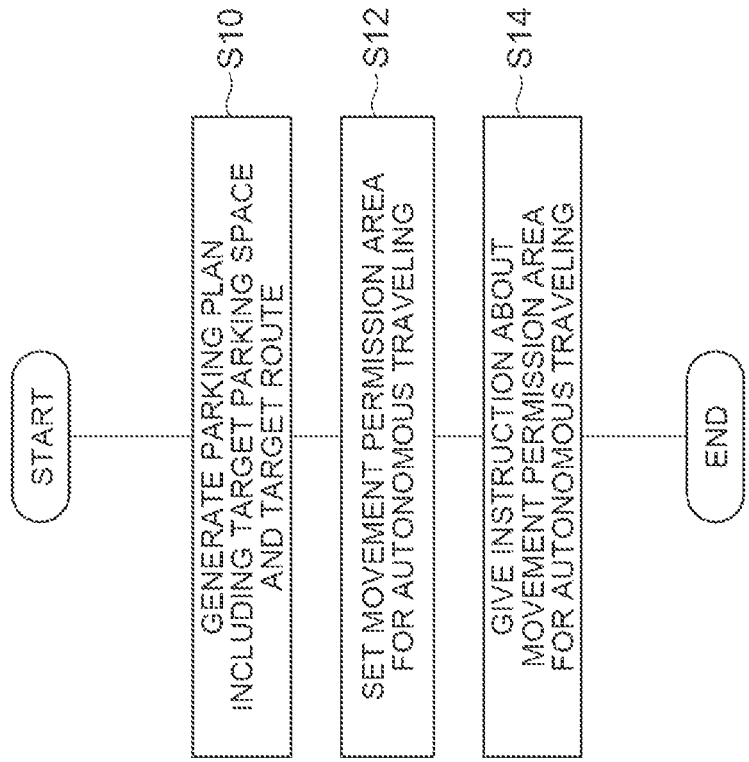
FIG. 9B is a flowchart illustrating an example of movement permission area instruction processing for automated valet parking.

FIG. 9B is a flowchart illustrating an example of movement permission area instruction processing for automated valet parking. The movement permission area instruction processing for automated valet parking is executed when, for example, there is the autonomous driving vehicle 2 that is performing the autonomous traveling by the automated valet parking.

As illustrated in FIG. 9B, the parking place control server 10 determines whether or not the autonomous driving vehicle 2 has arrived near the target parking space by the second movement permission area setting unit 15 in S20 (second movement permission area determination step). The second movement permission area setting unit 15 performs the above determination based on, for example, the positional information of the autonomous driving vehicle 2 transmitted from the autonomous driving vehicle 2. The positional information of the autonomous driving vehicle 2 may be detected by the parking place sensor 3.

When the parking place control server 10 determines that the autonomous driving vehicle 2 has arrived near the target parking space (S20: YES), the processing proceeds to S22. When the parking place control server 10 does not determine that the autonomous driving vehicle 2 has arrived near the target parking space (S20: NO), this processing is ended. Thereafter, when the parking place control server 10 acquires the positional information of the autonomous driving vehicle 2 newly or after a certain time has elapsed, the processing is repeated from S20 again.

In S22, the parking place control server 10 sets the movement permission area for automated valet parking by the second movement permission area setting unit 15 (second movement permission area setting step). The second movement permission area setting unit 15 sets the movement permission area for automated valet parking based on the positional information of the autonomous driving vehicle 2, the positional information of the target parking space, and the parking place map information. The movement permission area for automated valet parking may include the head swing region, may include the following vehicle entrance prohibition region, or may include the turn-back region. The movement permission area for autonomous traveling may be set while avoiding obstacles such as general vehicles.

In S24, the parking place control server 10 instructs the autonomous driving vehicle 2 about the movement permission area for automated valet parking by the second movement permission area instruction unit 16 (second movement permission area instruction step). The autonomous driving vehicle 2 executes the automated valet parking for the target parking space not to deviate from the movement permission area for automated valet parking.

In S20, instead of the determination processing of whether or not the autonomous driving vehicle 2 has arrived near the target parking space by the second movement permission area setting unit 15, determination processing of whether or not the notification indicating that the automated valet parking for the target parking space is started has been received from the autonomous driving vehicle 2.

[Control Method of Autonomous Driving Vehicle]

Figure 10:
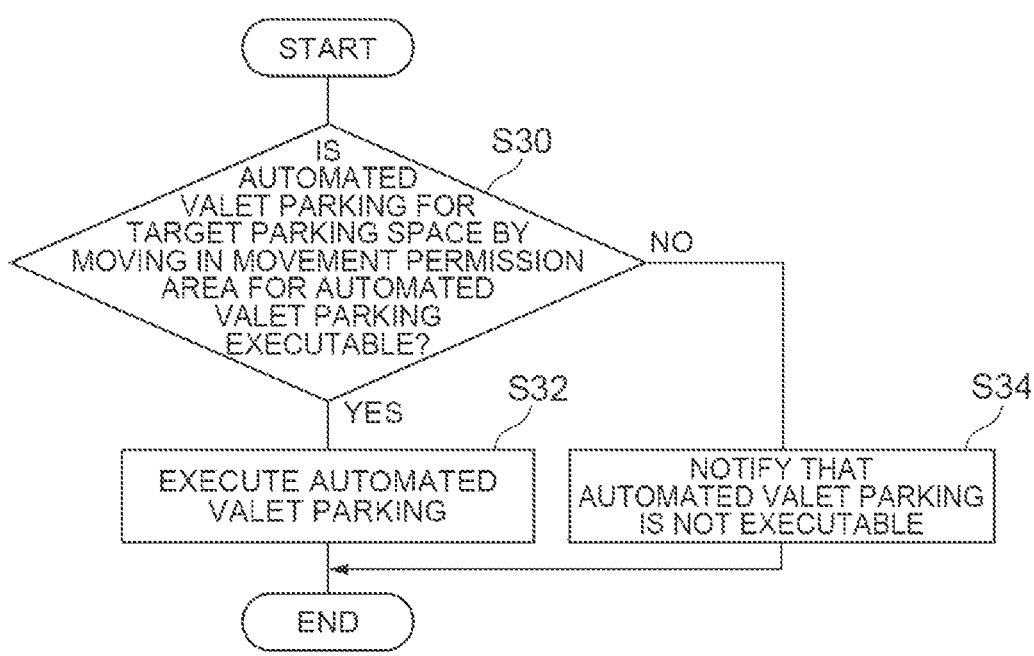
FIG. 10 is a flowchart illustrating an example of automated valet parking executable determination processing.

Next, an example of a control method (processing) of the autonomous driving vehicle according to the present embodiment will be described. FIG. 10 is a flowchart illustrating an example of automated valet parking executable determination processing. The automated valet parking executable determination processing is executed when the parking place control server 10 gives an instruction about the movement permission area for automated valet parking.

As illustrated in FIG. 10, in S30, the autonomous driving ECU 20 of the autonomous driving vehicle 2 determines whether or not the automated valet parking of autonomous driving vehicle 2 for the target parking space by moving in the movement permission area for automated valet parking is executable by the automated valet parking executable determination unit 36 (automated valet parking executable determination step). The automated valet parking executable determination unit 36 performs the above determination based on the vehicle body information of the autonomous driving vehicle 2 and the movement permission area for automated valet parking.

When the autonomous driving ECU 20 determines that the automated valet parking of the autonomous driving vehicle 2 for the target parking space by moving in the movement permission area for automated valet parking is executable (S30: YES), the processing proceeds to S32. When the autonomous driving ECU 20 does not determine that the automated valet parking of the autonomous driving vehicle 2 for the target parking space by moving in the movement permission area for automated valet parking is executable (S30: NO), the processing proceeds to S34.

In S32, the autonomous driving ECU 20 executes the automated valet parking for the target parking space by moving in the movement permission area for automated valet parking by the autonomous driving controller 35 (automated valet parking execution step). On the other hand, in S34, the autonomous driving ECU 20 notifies the parking place control server 10 that the automated valet parking of the autonomous driving vehicle 2 for the target parking space by moving in the movement permission area for automated valet parking is not executable (server notification step). Thereafter, when an instruction about a new movement permission area for automated valet parking is given from the parking place control server 10, the processing is repeated from S30 again.

In accordance with the automated valet parking system 1 according to the present embodiment described above, after the instruction about the movement permission area for autonomous traveling is given to the autonomous driving vehicle 2, when it is determined that the autonomous driving vehicle 2 has arrived near the target parking space or when the notification of the start of the automated valet parking for the target parking space is sent from the autonomous driving vehicle 2, since the instruction about the movement permission area for automated valet parking is given to the autonomous driving vehicle 2, the instructions about the movement permission area for autonomous traveling and the movement permission area for automated valet parking corresponding to the status of the autonomous driving vehicle 2 can be appropriately given. Accordingly, it is possible to separately set the movement permission area for autonomous traveling that does not need to cross a white line of the parking frame and the movement permission area for automated valet parking that may cross the white line of the parking frame for parking, and it is possible to prevent the execution of the automated valet parking of the autonomous driving vehicle 2 from being hindered due to the white line.

In accordance with the automated valet parking system 1, since it is possible to set the movement permission area for automated valet parking including the head swing region for the autonomous driving vehicle 2 to be parked in the target parking space by moving backward, it is easier to perform not only head-in parking of the autonomous driving vehicle 2 but also back-in parking than when the head swing region is not included, and it is possible to increase options for the parking of the autonomous driving vehicle 2.

In accordance with the automated valet parking system 1, the following autonomous driving vehicle is controlled not to enter the movement permission area for automated valet parking by setting the movement permission area for automated valet parking including the following vehicle entrance prohibition region, and thus, it is possible to prevent the following autonomous driving vehicle from excessively approaching the autonomous driving vehicle 2 that has started the automated valet parking.

In accordance with the automated valet parking system 1, since it is possible to set the movement permission area for automated valet parking including the turn-back region, when the autonomous driving vehicle cannot fit in the target parking space by moving forward once due to the size of the vehicle width of the autonomous driving vehicle 2 or the narrowness of the traveling path, the target parking space is not changed, and the automated valet parking into the target parking space can be implemented by the turn-back movement.

In accordance with the automated valet parking system 1, when the autonomous driving vehicle 2 controlled by the automated valet parking system 1 and the general vehicle uncontrollable by the automated valet parking system 1 coexist in the parking place, it is possible to appropriately set the movement permission area for automated valet parking based on the fact that the general vehicle is parked to protrude from the parking frame.

In accordance with the autonomous driving vehicle 2 according to the present embodiment, it is determined whether or not the automated valet parking of the autonomous driving vehicle 2 for the target parking space by moving in the movement permission area for automated valet parking is executable, and it is possible to notify the automated valet parking system 1 that the automated valet parking for the target parking space is not executable when it is determined that the automated valet parking is not executable.

Although the embodiment of the present disclosure has been described above, the present disclosure is not limited to the above-described embodiment. The present disclosure can be implemented in various forms including various modifications and improvements based on the knowledge of those skilled in the art, including the above-described embodiment.

What is claimed is:

1. An automated valet parking system that causes an autonomous driving vehicle in a parking place to autonomously travel toward a target parking space and causes the autonomous driving vehicle to be automatically parked in the target parking space, the system comprising:
    a vehicle information acquisition unit configured to acquire vehicle information of the autonomous driving vehicle through communication with the autonomous driving vehicle in the parking place, the vehicle information includes a vehicle turning radius, a vehicle size, and a vehicle width of the autonomous driving vehicle;
    a parking plan generation unit configured to generate a parking plan and set the target parking space corresponding to the acquired vehicle information of the autonomous driving vehicle;
    a first movement permission area setting unit configured to set a movement permission area for autonomous traveling that includes a part of a traveling path along which the autonomous driving vehicle reaches the target parking space and does not include the target parking space, based on positional information of the autonomous driving vehicle, positional information of the target parking space, and parking place map information;
    a first movement permission area instruction unit configured to, when the movement permission area for autonomous traveling is set, instruct the autonomous driving vehicle about the movement permission area for autonomous traveling;
    a second movement permission area setting unit configured to, when it is determined that the autonomous driving vehicle has arrived near the target parking space or when notification of a start of the automated valet parking for the target parking space is sent from the autonomous driving vehicle, set a movement permission area for automated valet parking that includes the target parking space and a part of the traveling path near the target parking space based on the positional information of the autonomous driving vehicle, the positional information of the target parking space, and the parking place map information; and
    a second movement permission area instruction unit configured to, when the movement permission area for automated valet parking is set, instruct the autonomous driving vehicle about the movement permission area for automated valet parking,
    wherein the parking place includes:
        a camera configured to detect a position of the autonomous driving vehicle in the parking place;
        an empty parking space sensor configured for detecting whether or not there is a parked vehicle in the target parking space, the empty parking space sensor is a pressure sensor, a radar sensor or a sonar sensor using radio waves configured to detect whether or not there is the parked vehicle in the target parking space, and
        a server positioned at parking place or remotely located from the parking place, the server configured to receive a plurality of captured images transmitted from the camera and the detection of whether there or not there is the parked vehicle in the target parking space from the empty parking space sensor and is further configured to continuously acquire the vehicle information from the vehicle and determine a status of the vehicle, the status including a vehicle speed of the vehicle and a yaw rate of the vehicle.

2. The automated valet parking system according to claim 1, wherein the second movement permission area setting unit is configured to set the movement permission area for automated valet parking including a head swing region in which the autonomous driving vehicle is parked in the target parking space by moving backward.

3. The automated valet parking system according to claim 1, wherein the second movement permission area setting unit is configured to, when the autonomous driving vehicle that performs the automated valet parking does not fit in the target parking space by moving forward once, set the movement permission area for automated valet parking including a turn-back region in which the autonomous driving vehicle fits in the target parking space by turn-back movement.

4. The automated valet parking system according to claim 1, wherein the second movement permission area setting unit is configured to
    set the movement permission area for automated valet parking including a following vehicle entrance prohibition region in which entrance of a following autonomous driving vehicle that is performing the autonomous traveling and follows the autonomous driving vehicle which is an instruction target of the movement permission area for automated valet parking is prohibited, and perform control such that the following autonomous driving vehicle does not enter the movement permission area for automated valet parking.

5. The automated valet parking system according to claim 1, wherein the second movement permission area setting unit is configured to, when a general vehicle parked to protrude from a parking frame of the parking place is recognized from a detection result of a parking place sensor provided in the parking place, set the movement permission area for automated valet parking not to include the general vehicle.

6. The automated valet parking system according to claim 2, wherein the second movement permission area setting unit is configured to
set the movement permission area for automated valet parking including a following vehicle entrance prohibition region in which entrance of a following autonomous driving vehicle that is performing the autonomous traveling and follows the autonomous driving vehicle which is an instruction target of the movement permission area for automated valet parking is prohibited, and
perform control such that the following autonomous driving vehicle does not enter the movement permission area for automated valet parking.

7. The automated valet parking system according to claim 3, wherein the second movement permission area setting unit is configured to
set the movement permission area for automated valet parking including a following vehicle entrance prohibition region in which entrance of a following autonomous driving vehicle that is performing the autonomous traveling and follows the autonomous driving vehicle which is an instruction target of the movement permission area for automated valet parking is prohibited, and
perform control such that the following autonomous driving vehicle does not enter the movement permission area for automated valet parking.

8. The automated valet parking system according to claim 2, wherein the second movement permission area setting unit is configured to, when a general vehicle parked to protrude from a parking frame of the parking place is recognized from a detection result of a parking place sensor provided in the parking place, set the movement permission area for automated valet parking not to include the general vehicle.

9. The automated valet parking system according to claim 3, wherein the second movement permission area setting unit is configured to, when a general vehicle parked to protrude from a parking frame of the parking place is recognized from a detection result of a parking place sensor provided in the parking place, set the movement permission area for automated valet parking not to include the general vehicle.

10. The automated valet parking system according to claim 4, wherein the second movement permission area setting unit is configured to, when a general vehicle parked to protrude from a parking frame of the parking place is recognized from a detection result of a parking place sensor provided in the parking place, set the movement permission area for automated valet parking not to include the general vehicle.

11. An autonomous driving vehicle that receives an instruction related to the automated valet parking from the automated valet parking system according to claim 1, the vehicle comprising:
an automated valet parking executable determination unit configured to determine whether or not the automated valet parking of the autonomous driving vehicle for the target parking space by moving in the movement permission area for automated valet parking is executable based on vehicle body information of the autonomous driving vehicle and the movement permission area for automated valet parking when an instruction about the movement permission area for automated valet parking is received from the second movement permission area instruction unit of the automated valet parking system,
wherein the automated valet parking executable determination unit is configured to, when it is determined that the automated valet parking of the autonomous driving vehicle for the target parking space by moving in the movement permission area for automated valet parking is not executable, notify the automated valet parking system that the automated valet parking for the target parking space is not executable.

12. An autonomous driving vehicle that receives an instruction related to the automated valet parking from the automated valet parking system according to claim 2, the vehicle comprising:
an automated valet parking executable determination unit configured to determine whether or not the automated valet parking of the autonomous driving vehicle for the target parking space by moving in the movement permission area for automated valet parking is executable based on vehicle body information of the autonomous driving vehicle and the movement permission area for automated valet parking when an instruction about the movement permission area for automated valet parking is received from the second movement permission area instruction unit of the automated valet parking system,
wherein the automated valet parking executable determination unit is configured to, when it is determined that the automated valet parking of the autonomous driving vehicle for the target parking space by moving in the movement permission area for automated valet parking is not executable, notify the automated valet parking system that the automated valet parking for the target parking space is not executable.

13. An autonomous driving vehicle that receives an instruction related to the automated valet parking from the automated valet parking system according to claim 3, the vehicle comprising:
an automated valet parking executable determination unit configured to determine whether or not the automated valet parking of the autonomous driving vehicle for the target parking space by moving in the movement permission area for automated valet parking is executable based on vehicle body information of the autonomous driving vehicle and the movement permission area for automated valet parking when an instruction about the movement permission area for automated valet parking is received from the second movement permission area instruction unit of the automated valet parking system,
wherein the automated valet parking executable determination unit is configured to, when it is determined that the automated valet parking of the autonomous driving vehicle for the target parking space by moving in the movement permission area for automated valet parking is not executable, notify the automated valet parking system that the automated valet parking for the target parking space is not executable.

14. An autonomous driving vehicle that receives an instruction related to the automated valet parking from the automated valet parking system according to claim 4, the vehicle comprising:
an automated valet parking executable determination unit configured to determine whether or not the automated valet parking of the autonomous driving vehicle for the target parking space by moving in the movement permission area for automated valet parking is executable based on vehicle body information of the autonomous driving vehicle and the movement permission area for automated valet parking when an instruction about the movement permission area for automated valet parking is received from the second movement permission area instruction unit of the automated valet parking system,
wherein the automated valet parking executable determination unit is configured to, when it is determined that the automated valet parking of the autonomous driving vehicle for the target parking space by moving in the movement permission area for automated valet parking is not executable, notify the automated valet parking system that the automated valet parking for the target parking space is not executable.

15. An autonomous driving vehicle that receives an instruction related to the automated valet parking from the automated valet parking system according to claim 5, the vehicle comprising:
an automated valet parking executable determination unit configured to determine whether or not the automated valet parking of the autonomous driving vehicle for the target parking space by moving in the movement permission area for automated valet parking is executable based on vehicle body information of the autonomous driving vehicle and the movement permission area for automated valet parking when an instruction about the movement permission area for automated valet parking is received from the second movement permission area instruction unit of the automated valet parking system,
wherein the automated valet parking executable determination unit is configured to, when it is determined that the automated valet parking of the autonomous driving vehicle for the target parking space by moving in the movement permission area for automated valet parking is not executable, notify the automated valet parking system that the automated valet parking for the target parking space is not executable.

16. A control method of an automated valet parking system that causes an autonomous driving vehicle in a parking place to autonomously travel toward a target parking space and causes the autonomous driving vehicle to be automatically parked in the target parking space, the method comprising:
acquiring a vehicle information of the autonomous driving vehicle through communication with the autonomous driving vehicle in the parking place, the vehicle information includes a vehicle turning radius, a vehicle size, and a vehicle width of the autonomous driving vehicle;
generating a parking plan and setting the target parking space corresponding to the acquired vehicle information of the autonomous driving vehicle;
setting a movement permission area for autonomous traveling that includes a part of a traveling path along which the autonomous driving vehicle reaches the target parking space and does not include the target parking space based on positional information of the autonomous driving vehicle, positional information of the target parking space, and parking place map information;
instructing the autonomous driving vehicle about the movement permission area for autonomous traveling when the movement permission area for autonomous traveling is set;
setting a movement permission area for automated valet parking that includes the target parking space and a part of the traveling path near the target parking space based on the positional information of the autonomous driving vehicle, the positional information of the target parking space, and the parking place map information when it is determined that the autonomous driving vehicle has arrived near the target parking space or when notification of a start of the automated valet parking for the target parking space is sent from the autonomous driving vehicle; and
instructing the autonomous driving vehicle about the movement permission area for automated valet parking when the movement permission area for automated valet parking is set,
wherein the parking place includes:
a camera configured to detect a position of the autonomous driving vehicle in the parking place;
an empty parking space sensor configured for detecting whether or not there is a parked vehicle in the target parking space, the empty parking space sensor is a pressure sensor, a radar sensor or a sonar sensor using radio waves configured to detect whether or not there is the parked vehicle in the target parking space, and
a server positioned at parking place or remotely located from the parking place, the server configured to receive a plurality of captured images transmitted from the camera and the detection of whether there or not there is the parked vehicle in the target parking space from the empty parking space sensor and is further configured to continuously acquire the vehicle information from the vehicle and determine a status of the vehicle, the status including a vehicle speed of the vehicle and a yaw rate of the vehicle.

\* \* \* \* \*